United States Patent [19]

Manduley et al.

[11] Patent Number: 5,322,977
[45] Date of Patent: Jun. 21, 1994

[54] MAIL PROCESSING SYSTEM FOR VERIFYING POSTAGE AMOUNT

[75] Inventors: Flavio M. Manduley, Woodbury; Leon A. Pintsov, West Hartford, both of Conn.

[73] Assignee: Pitney Bowes Inc., Stamford, Conn.

[21] Appl. No.: 109,569

[22] Filed: Aug. 20, 1993

Related U.S. Application Data

[62] Division of Ser. No. 952,071, Sep. 25, 1992.

[51] Int. Cl.⁵ .................. G01G 19/40; G01G 19/52; G06F 15/20
[52] U.S. Cl. ........................... 177/25.15; 177/50; 364/464.03
[58] Field of Search ............ 177/25.15, 50; 364/464.02, 464.03, 466

[56] References Cited

U.S. PATENT DOCUMENTS 5,072,400 12/1991 Manduley .............. 364/464.03 X

Primary Examiner—George H. Miller, Jr.
Attorney, Agent, or Firm—Charles G. Parks, Jr.; Melvin J. Scolnick

[57] ABSTRACT

The method and apparatus for verifying that the correct postage has been paid includes a mail processing machine which is adapted to receive properly oriented mail via a transport from a racer apparatus. The mail processing machine includes a scale for weighing a mailpiece having postage affixed thereto for the purpose of cancelling it with a mark which includes the actual postage which should be affixed. In a further embodiment other information necessary to calculate the necessary postage is obtained by reading the information from the mailpiece. Any discrepancies between the postage affixed and the amount of postage which should actually be paid may be noted at acceptance or seen by the carrier as the mail is delivered. A batch of mail may be sampled to select representative mailpieces in a random manner and verified to compare the calculated total of postage required based on the sample to the postal amount paid for the batch by the sender.

8 Claims, 2 Drawing Sheets

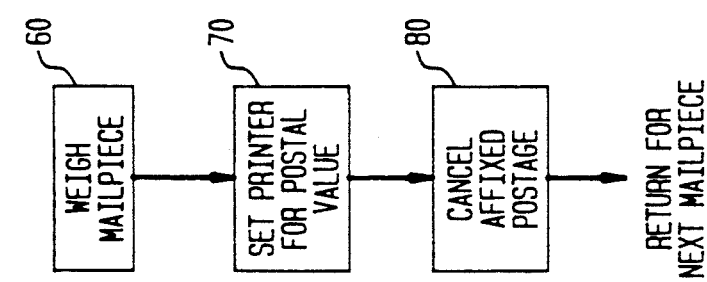
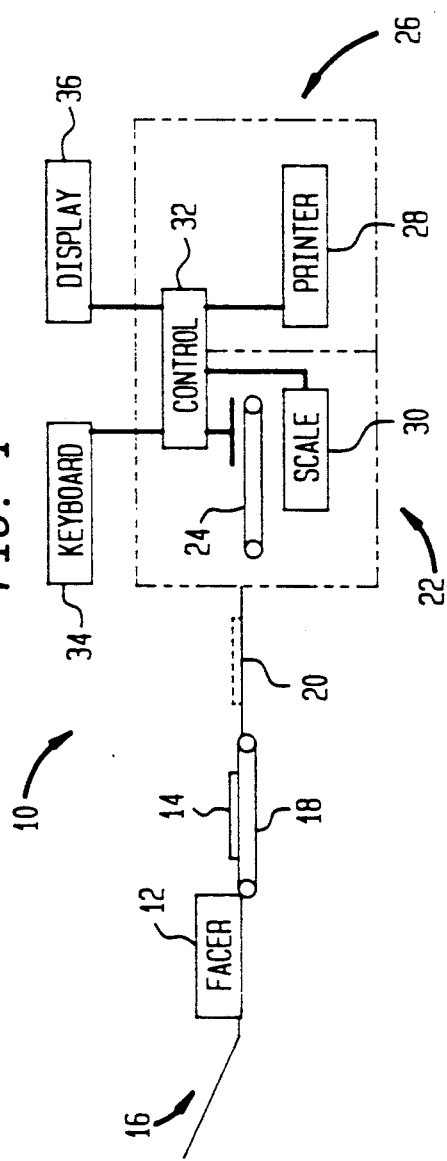
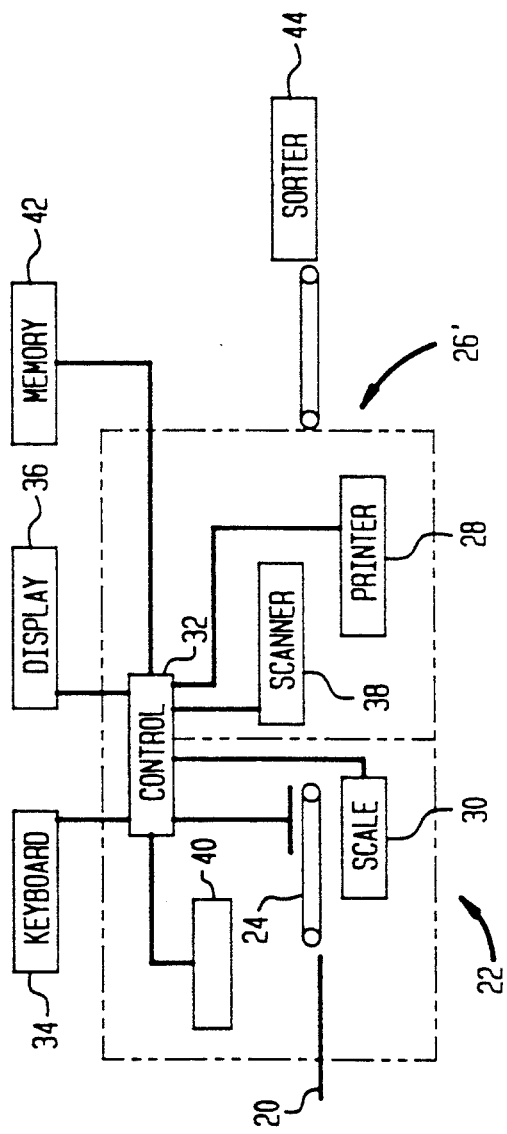

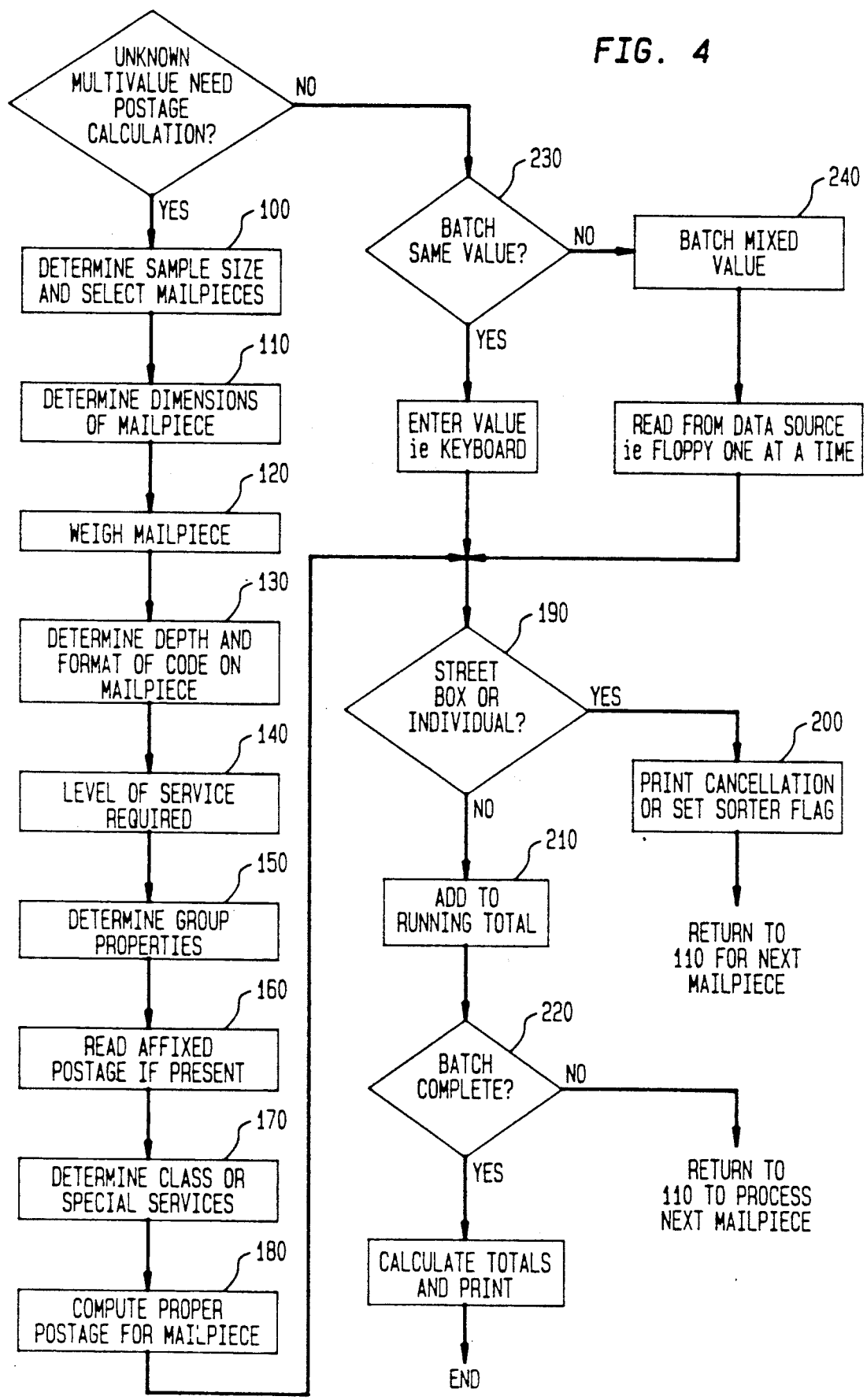

MAIL PROCESSING SYSTEM FOR VERIFYING POSTAGE AMOUNT

RELATED PATENTS

This application is a divisional of U.S. patent application Ser. No. 07/952,071 filed on Sep. 25, 1992.

FIELD OF THE INVENTION

The invention relates to mail processing and delivery systems and more particularly to cancelling apparatus which is adapted to mark or "cancel" the postage affixed to or printed on a mailpiece to prevent its reuse.

BACKGROUND OF THE INVENTION

In typical mail distribution operations at the various post offices worldwide, the metered and stamped mail is received in enormous volumes. In large mail distribution centers, if the mailpieces carry an imprinted indicia, the mailpieces are processed by sorters to sort the mail to its destination or in the event that the mailpiece has an affixed stamp, it is processed by the so-called facer-canceller which can orient the mailpiece cancel the stamp prior to the sorting of these mailpieces. In either case the actual weight of the mailpiece is normally never checked during the course of these operations.

As is well known in the United States and in many other countries, the postage amount required for delivery increases with the weight and size of the mailpiece. Accordingly, the Post Office will lose revenue on its delivery if in fact the postal rate (according to the postal Weight-Rate Tables) corresponding to the weight and/or size of the mailpiece exceeds the postage paid. In fact, one of the major factors contributing to loss of revenue is perceived to be the underpayment for individual mailpieces, and particularly those individual mailpieces being sent in batch mailings. In the conventional postal delivery systems, however, the costs associated with verifying the correct postage on an individual mailpiece may be prohibitive in terms of employee time since each piece to be verified must be manually extracted and individually weighed and rated either at entry into the mailstream or at some time during subsequent mail processing and delivery.

For batch mailings, there is normally a manual sampling and rating of mailpieces prior to merging them into the mailstream at the facility, but it will be appreciated that this sampling is at best inefficient because of possible human errors and the small sample size of such manual checking.

U.S. Pat. No. 5,072,400 to Mandulay discloses a system for monitoring the integrity of mail pieces passing through the delivery system for tracking and prevention of theft. In this system a data base is updated to include the initial weight and destination address of a mailpiece. As the mailpiece moves through the system the weight and the destination data are compared at the various stages to determine any discrepancies.

U.S. Pat. No. 5,019,991 to Sansone et.al., entitled CERTIFIED WEIGHER-SHORT PAID MAIL describes a system for assuring the post office that the weight of a mailpiece which would ordinarily require more postage was correctly accounted with consideration to other postage discounts, for example, number of mailpieces being sent to a particular ZIP-code. U.S. Pat. No. 5,008,827 to Sansone, et.al., entitled CENTRAL POSTAGE DATA COMMUNICATION NETWORK describes a user system for certifying by marking a pre-posted mailpiece that any required additional postage due on the mailpiece has been accounted for to the post office.

While each of these work well for the intended purposes, they do not address the problem of routinely assuring that mailpieces which may enter the mailstream at the post offices from the counter, letter boxes or in batch mailings carry sufficient postage. The teaching of the '400 patent also requires the use of extensive computer facilities for maintaining the database and for certifying and protecting the accounting for postage.

SUMMARY OF THE INVENTION

It is therefore an object of the invention to provide a novel method and apparatus for verifying that the required postage amount is affixed to a mailpiece.

It is a further object to provide a method and apparatus for automatic verification of batches of mailpieces.

These and other objects of the invention are realized in an apparatus for verifying postage paid comprising a facet means operative for orienting and presenting mailpieces for cancelling of postage affixed thereto; a weighing module for receiving a mailpiece having postage affixed thereon from the facet means and weighing said mailpiece; printing means; a transport means for transporting the mailpiece from the weighing module to the printing means; said printing means being operative for marking on said mailpiece a cancelling marking corresponding to correct postage for the mailpiece in correspondence with a determined rating and a weight as determined by the weighing means, whereby the marking enables comparison between postage affixed to the mailpiece and the actual value of required postage for delivery of the mailpiece.

In a second embodiment the apparatus comprises a data entry means and a display for input and output of data relating to a batch of mail; a weighing module for weighing a mailpiece having postage affixed thereon; scanning means for reading character information from the mailpiece; printing means; a transport means for transporting the mailpiece for scanning thereof from the weighing module to the printing means; said printing means being selectably operable for marking on said mailpiece a marking corresponding to correct postage for the mailpiece in correspondence with a weight as determined by the weighing means and rating information determinable from scanning of said mailpiece, whereby the marking enables comparison between postage affixed to the mailpiece and the actual value of required postage for delivery of the mailpiece.

In another aspect there is provided a method for verifying the postage on a mailpiece having postage affixed thereto comprising the steps of weighing a mailpiece having postage previously affixed thereto, setting a printing mechanism adapted for printing postal value to a value corresponding to a weight obtained from the weighing of said mailpiece, and cancelling the previously affixed postage using said printing mechanism to provide a cancellation mark that includes a value of postage calculated from rating information and the weight obtained from the weighing step.

In any of the foregoing aspects of the invention, the printing means may further comprise means operative for printing the date of cancellation.

BRIEF DESCRIPTION OF THE DRAWING

FIG. 1 is a block diagram of a cancelling apparatus in accordance with the invention.

FIG. 2 is a flow chart of the basic operation of the cancelling process in accordance with the invention.

FIG. 3 is a block diagram of another embodiment of an apparatus particularly adapted for verifying larger batches of mail.

FIG. 4 is a flow chart of the method for verifying postage in accordance with the invention in respect of the apparatus of FIG. 3.

DESCRIPTION OF THE PREFERRED EMBODIMENT

In FIG. 1, there is shown generally at 10 a block diagram of a postage verifying system in accordance with the invention. The apparatus comprises a racer 12 which may be a conventional racer portion of a conventional facer-canceller, such as those typically used in the present mail-distribution facilities of the Post Office.

The facer 12 receives a mailpiece indicated at 14 from the input hopper 16 which holds the mailpieces to be verified and orients the mailpiece in conventional manner to position the mailpiece in the proper position for cancelling of the postage stamp (or meter impression). The term postage affixed to a mailpiece as used herein shall refer to both stamps and meter impressions signifying that value has been paid for the sending of the mailpiece. In accordance with the invention, instead of being transported as previously known to the conventional canceller section of the facer-canceller, the oriented mailpiece 14 is delivered by a mailpiece transport such as the continuous belt indicated at 18 to the input hopper 20 of a mailing machine comprising feeder section 22 which includes a transport 24 and an electronic postage meter section at 26. Mailpieces such as the mailpiece 14 placed on the hopper 20 are serially fed to the meter section 26 for overprinting of a cancelling indicia by a printing mechanism shown in block 28. The cancelling indicia printed by printing mechanism 28 includes postage value and, if desired or required by Post Office regulations for example, the current date. The mailing machine feeder section 22 includes scale 30 for weighing the mailpiece and communicating its weight to a microprocessor control apparatus 32 so that the appropriate postage value may be imprinted on the mailpiece as communicated either directly to the meter or by way of the microprocessor control apparatus 32. In the preferred embodiment illustrated here, the meter section 26 comprises a detachable meter which may be easily removed and replaced by similar types of meter apparatus having other features as described below.

If desired, a suitable keyboard 34 and display 36 communicate with the microprocessor control apparatus 32 for input and output of information in relation to scale 30, meter section 26, and transport 24.

A more detailed description of a suitable mailing machine is described in U.S. Pat. No. 4,935,078 entitled High Throughput Mailing Machine Timing, assigned to the assignee of the instant application and specifically incorporated by reference herein.

It will be appreciated by those skilled in the art that in order to provide the cancelling function in accordance with the invention, the inking of the indicia normally associated with postage metering function must be changed to be indelible ink, for example the conventional ink used by a Postal Authority, in order to prevent the washing of stamps for reuse. Other colors may also be used, if desired for instance, to distinguish the mailpieces that have been cancelled by the apparatus in accordance with the invention from the conventional cancellations of the Postal Authority.

It will also be understood that the printer which in a preferred embodiment is a postage meter printer, is not required in the instant situation to account for funds expended and therefore the accounting routines and security measures normally associated with the known meters may be simplified. While it is not believed necessary to change the format of the indicia typically used for imprinted postage meter indicias, except as necessary to distinguish it from valid postage meter impressions, it will also be appreciated that other markings are also contemplated in the event that a particular figure is required to allow the underlying value on the previously affixed postage to be readable.

In operation of the apparatus of FIG. 1 as seen in conjunction with the flowchart as illustrated in FIG. 2, the mailpieces having previously affixed postage are placed in the hopper 16 of the facet portion where the individual mailpieces are oriented and fed to hopper 20 of the mailing machine feeder section 22. The mailpiece is weighed, block 60 of FIG. 2, and the printer is set for the current date and appropriate postage, block 70, in accordance with the weight of the mailpiece and pertinent rating information as stored in the microprocessor control 32 or input through keyboard 34 or other input means. As the mailpiece is transported through the meter portion, an indicia including the date and valid postage amount for the particular mailpiece is printed over the previously affixed postage amount, block 80, thereby allowing easy comparison by a postal route carrier or other Post Office official to determine whether additional postage is due while at the same time cancelling the previously affixed postage. It will be appreciated that the mark showing the amount of postage required may be placed anywhere on the mailpiece so long as the cancelling of the previously affixed postage is also accomplished.

FIG. 3 shows another embodiment of the invention 5 particularly adapted for verification of larger batches of mail wherein the electronic meter section shown at 26' further comprises a scanner 38, such as, for example, one of the well known OCR readers and/or postal bar code readers, which is operative to read address as well as other determined information and the value of the postage affixed to the mailpiece as well as any presort and barcode information if desired, in order to capture additional information such as the address and the affixed postal amount. It will be understood that the scanner can be placed at other positions along the path of the mailpiece, however when located in the meter section in cooperation with the printer, the replacement of the meter unit with the scanner printer is enabled in a particularly convenient manner.

In a preferred embodiment, the printing mechanism may be made to operate selectably where it is desired to simply store the information in relation to the scanned mailpieces and compare the actual total postage due with the amount submitted by the sender, for example, on a manifest. This result may then be printed at the end of the run either by the printing mechanism 28 or by a separate printer (not shown) for comparison to a manifest or other documentation.

It should be noted that in FIG. 3 those modules which are unchanged from FIG. 1 retain the same numbers. Additional mailpiece measurement apparatus indicated at block 40 may also be included to determine the sizes of the pieces in order to further determine if a particular rating should be applied. This may be a separate module, but it could also be conventional photodiode detectors, arranged as required in the transport path at a convenient point, which are blocked and unblocked by various sized mailpieces If required, additional memories shown at 42 for storage of information and look-up tables may be added in known manner to communicate with the microprocessor control 32. Similarly, the required input data and output data from the mailing machine control 32 may be obtained from and/or fed to additional computers or data storage devices not shown. The mailpieces may be sent to an optional sorter 44 for further processing if desired.

FIG. 4 illustrates the method for verification using the apparatus of FIG. 3. The first step indicated at 100 is sampling of the batch of mail submitted for verification. It will be understood that the sample may include the entire batch of mailpieces in a particular mailing, but this is believed to be inefficient and not necessarily required for adequate verification of a batch of mail.

Two attributes of the sampling have been found to be important. The first is to assure that the sample is random, in other words, that the selected pieces are not biased in terms of belonging to a group not with a specific property not present in other members of the batch. It will be understood that randomness can never be guaranteed; however, it is believed that standard measures such as selecting mailpieces from different sources and places, having different size, weight and make-up can establish reasonable randomness of the sample.

The second important attribute is the size of the sample taken. The size of the sample in a sense guarantees representativeness of the sample. It will be appreciated that the size of the sample can be determined using well-known statistical procedures. See, for example, Snedecor and Cochran, *Statistical Methods*, The Iowa State University Press, 1979. The size of the sample is a function of the allowable error, the desired confidence level and the estimated size of the batch.

It has been found, by way of example only and not as a limitation, that even for a very large mailing, a 1% error having a 95% confidence level defines the size of sample as 1,475 mailpieces assuming a binomial distribution for correct/incorrect postage and probability of success (correct postage) at 96% and probability of incorrect postage 4%. With a mailing machine capability of processing, for example, only 3000 pieces per hour, a sample of this size may be processed in about 30 minutes.

For best results, the determination can be carried out under control of the microprocessor control 32 and the sample size displayed as a result of operator input as to size of the batch, allowed error and confidence level. After entry of the data by the operator the required sample size is displayed.

Once the sample size is determined the mailpieces are selected and processed. As the individual mailpieces are fed through the mailing machine, the geometrical dimensions are obtained, block 110; the weight is obtained, block 120; the level of standardization, that is, the depth and format of the postal code present on the mailpiece is determined, block 130; the level of service, for example, desired delivery time is obtained, block 140; the group property or presort level is obtained, block 150; the declared or printed postage value is read, block 160; and the class and other special services are obtained, block 170.

The proper postage rate for a given mailpiece is then computed using the data elements thus obtained, block 180. It will be appreciated that this computation can either be by way of algorithm or simply by using a look-up table which has multiple discrete entries for size, weight, level of service, etc.

It will be understood that where the postage rate is also determined by the level of presort, this group property is not determinable from a single mailpiece. In this case it will be appreciated that the entire group of mailpieces which belong to the same sorting entity must be included in the sample and in this case the assurance of sample randomness is more difficult.

If the individual mailpieces are collected from street boxes, for example, at the YES branch of decision block 190, the sorter 44 may be set to outsort or otherwise flag mailpieces for which the determined postage rating value fails to match the amount affixed to the mailpiece, block 200. The incorrectly postaged mailpieces can be returned to sender for insufficient postage.

In the alternative, particularly where the mailpieces have no printed evidence of postage to compare, at the NO branch of block 190, the postage due for the mailpiece is added to a running total, block 210, and the routine loops back to repeat the checking of the next mailpiece. When the last mailpiece is checked, decision block 220, the postage due for the entire mailing is computed based on the verified sample and printed out along with the allowed margin for error, block 230. This total can be compared with the manifested value of the mailing and additional postage can be levied in the event the discrepancy exceeds some specified value. It will be appreciated that if desired the value determined for each mailpiece could be printed on the mailpiece to provide proof of checking in this situation as well.

It will be understood that the embodiment illustrated in FIG. 3 can also be simplified to operate in a semiautomatic mode. Such a system may, for example, require manual input of the information obtained as a result of the scanning and recognition process. In a simple implementation, the postage amount and postal code are displayed to the operator who enters these via the keyboard 34. The postal rate is computed and printed over the previously affixed postage and the incorrectly postaged mailpieces are outsorted as previously described.

It will be further appreciated that a particularly efficient operation is obtained in the apparatus in accordance with the invention for those batches of mailpieces in which each mailpiece is anticipated to require the same amount of postage (shown at 230). For instance, in the U.S. the apparatus might be set to 29 cents for mailpieces weighing an oz. or less. In such case the mailpieces could be efficiently scanned to outsort those mailpieces carrying insufficient affixed postage with no further operator input required beyond the initial setup for the anticipated rate.

In another mode of operation (shown at 240) information may be provided to the apparatus from an external source (such as a floppy disk), describing the amount of postage required by each mailpiece in a group to be processed.

What is claimed is:

1. Apparatus for verifying postage paid comprising a data entry means and a display for input and output of data relating to a batch of mail; a weighing module for weighing a mailpiece having postage affixed thereon; scanning means for reading character information from the mailpiece; printing means; a transport means for transporting the mailpiece for scanning thereof from the weighing module to the printing means; said printing means being selectably operable for marking on said mailpiece a marking corresponding to correct postage for the mailpiece in correspondence with a weight as determined by the weighing means and a rating of said mailpiece, whereby the marking enables comparison between postage affixed to the mailpiece and the actual value of required postage for delivery of the mailpiece.

2. The apparatus of claim 1 wherein the marking cancels the postage affixed to the mailpiece.

3. The apparatus of claim 2 further comprising means for printing a data as a portion of the cancelling marking.

4. The apparatus of claim 2 wherein the printing means prints the cancelling mark using an indelible ink.

5. The apparatus of claim 2 wherein the indelible ink is selected to distinguish from an ink used by a postal authority for a conventional cancellation mark.

6. The apparatus of claim 1 further comprising measuring means for measuring the size of the mailpiece.

7. The apparatus of claim 1 further comprising means for determining the size of a statistical sample for a representative selection of mailpieces from a submitted batch of mail to be verified.

8. The apparatus of claim 1 wherein the character information to be read includes address information on the mailpiece.

* * * * *